(12) United States Patent
Wu et al.

(10) Patent No.: US 8,649,054 B2
(45) Date of Patent: Feb. 11, 2014

(54) COLOR REGISTRATION STRATEGY FOR PREPRINTED FORM

(75) Inventors: Wencheng Wu, Webster, NY (US); Edul N. Dalal, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 707 days.

(21) Appl. No.: 12/772,657

(22) Filed: May 3, 2010

(65) Prior Publication Data

US 2011/0267632 A1 Nov. 3, 2011

(51) Int. Cl.
*G06K 1/00* (2006.01)
*G06K 9/00* (2006.01)
*B41J 2/385* (2006.01)
*G03G 15/01* (2006.01)

(52) U.S. Cl.
USPC ............ 358/1.9; 358/502; 358/504; 382/151; 347/116; 399/301

(58) Field of Classification Search
None
See application file for complete search history.

(56) References Cited

U.S. PATENT DOCUMENTS

| | | | | |
|---|---|---|---|---|
| 4,668,619 A | * | 5/1987 | Greenquist et al. | 435/7.7 |
| 6,529,616 B1 | * | 3/2003 | Rasmussen et al. | 382/112 |
| 7,059,246 B2 | * | 6/2006 | Riepenhoff et al. | 101/451 |
| 7,427,118 B2 | * | 9/2008 | Mizes et al. | 347/19 |
| 7,630,519 B2 | | 12/2009 | Nagarajan | |
| 8,319,202 B2 | * | 11/2012 | Viturro et al. | 250/548 |
| 2008/0062219 A1 | * | 3/2008 | Mizes et al. | 347/19 |
| 2008/0124158 A1 | | 5/2008 | Folkins | |
| 2008/0303854 A1 | * | 12/2008 | Mizes et al. | 347/19 |
| 2009/0265950 A1 | | 10/2009 | Mizes et al. | |

OTHER PUBLICATIONS

Yongsoon Eun, U.S. Appl. No. 12/274,566, filed Nov. 20, 2008.
Howard Mizes, U.S. Appl. No. 12/372,294, filed Feb. 17, 2009.
James Edward Williams, U.S. Appl. No. 12/197,492, filed Aug. 25, 2008.
R. Enrique Viturro, U.S. Appl. No. 12/755,117, filed Apr. 6, 2010.
Dalal et al., The Effect of Gloss on Color, May 4, 1998, Color Research and Application, vol. 24, No. 5, Oct. 1999, pp. 369-376.

* cited by examiner

*Primary Examiner* — Steven Kau
(74) *Attorney, Agent, or Firm* — Pillsbury Winthrop Shaw Pittman, LLP

(57) ABSTRACT

A method for performing color registration on template media having template markings thereon comprises sensing the template media using a sensor to obtain first image data; printing a test pattern on the template media; sensing the template media along with the test pattern printed thereon using the sensor to obtain second image data; determining an output image data of the test pattern from the first image data, the second image data, and an estimated image data of the template media with the test pattern printed thereon; determining process direction and cross-process direction misregistrations from the output image data; and adjusting printheads based on the process direction and the cross-process direction misregistrations to provide adjusted color registration on subsequent template media. The estimated image data is representative of light scatter from the test pattern and light absorption by the test pattern.

26 Claims, 10 Drawing Sheets

NOTE: QUALITY OF IMAGE IS LOW (ACTUAL IMAGE)

NOTE: QUALITY OF IMAGE IS LOW (ACTUAL IMAGE)

NOTE: QUALITY OF IMAGE IS LOW (ACTUAL IMAGE)

NOTE: QUALITY OF IMAGE IS LOW (ACTUAL IMAGE)

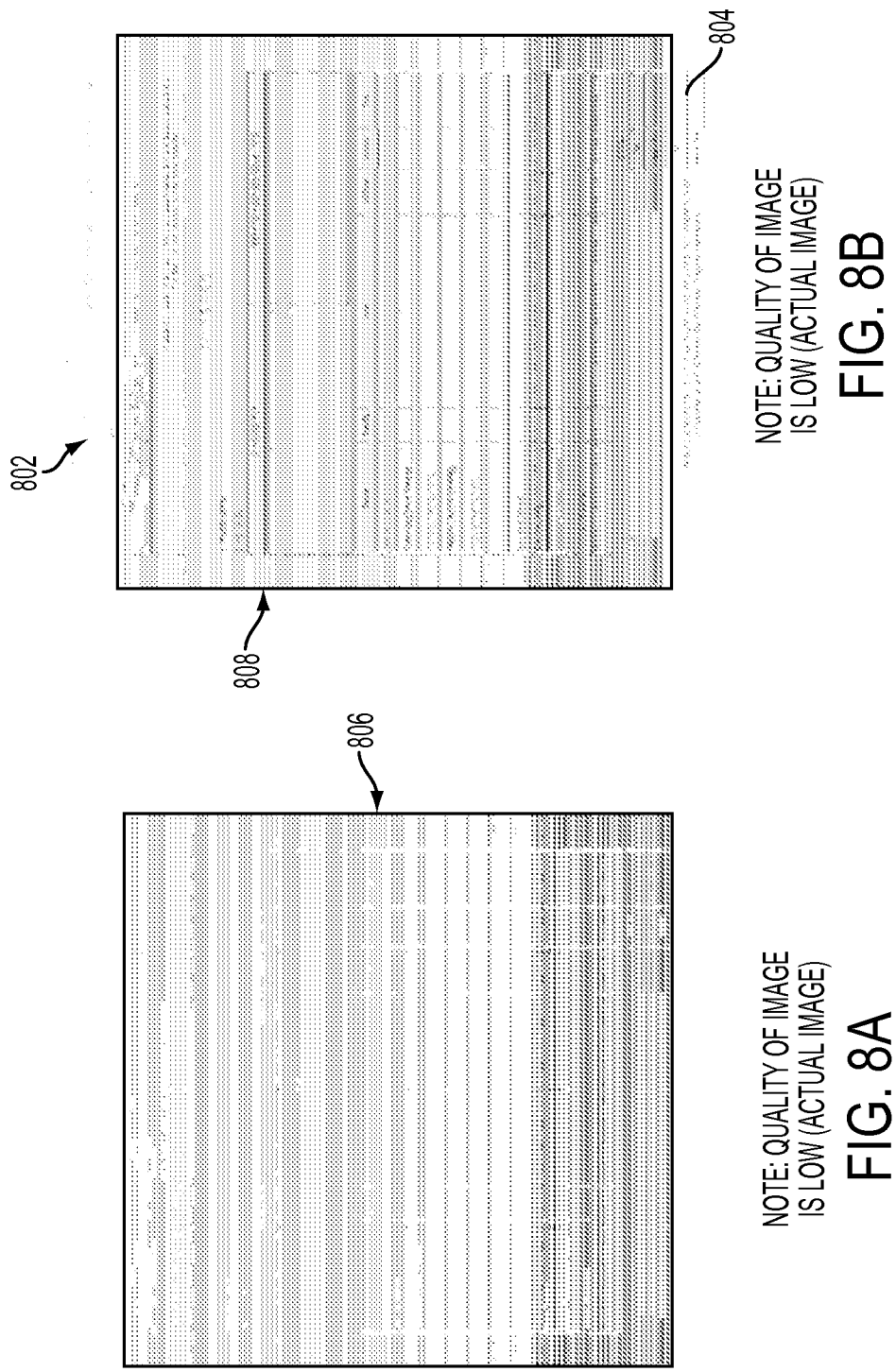

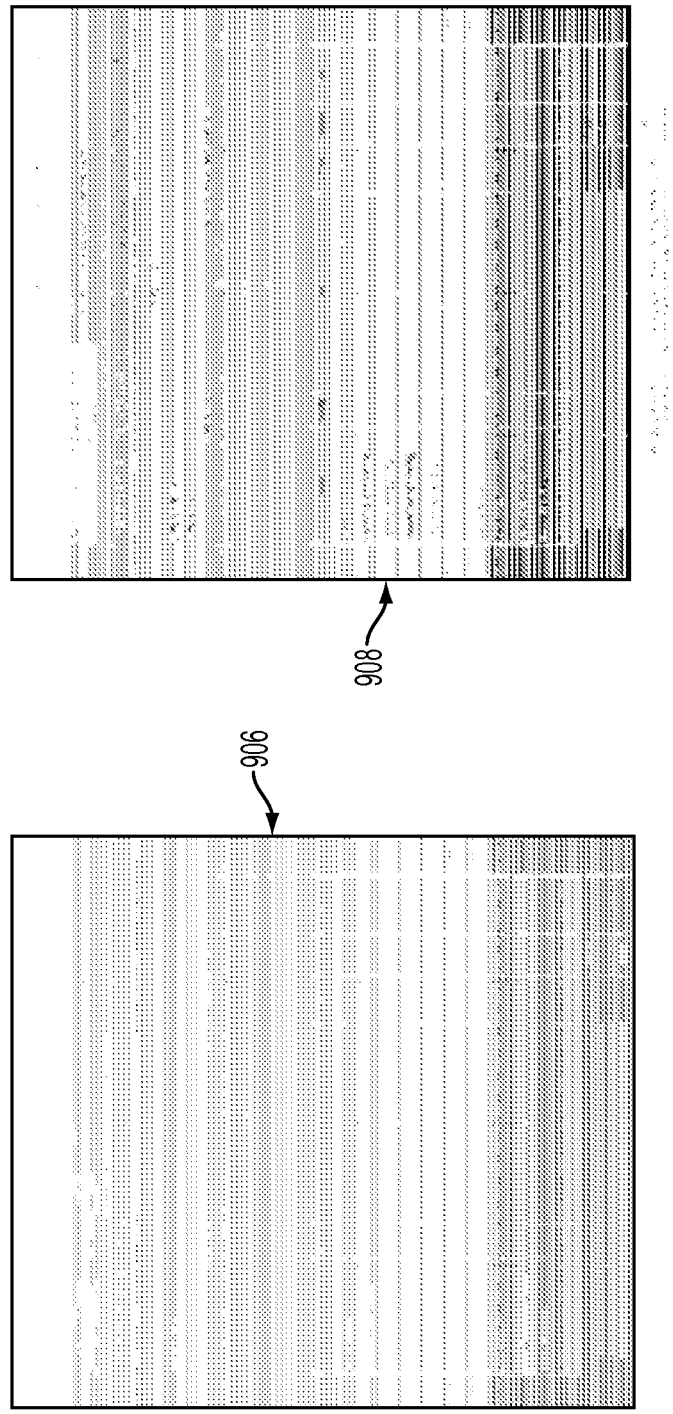

NOTE: QUALITY OF IMAGE
IS LOW (ACTUAL IMAGE)

NOTE: QUALITY OF IMAGE
IS LOW (ACTUAL IMAGE)

NOTE: QUALITY OF IMAGE
IS LOW (ACTUAL IMAGE)

NOTE: QUALITY OF IMAGE
IS LOW (ACTUAL IMAGE)

NOTE: QUALITY OF IMAGE IS LOW (ACTUAL IMAGE)

NOTE: QUALITY OF IMAGE IS LOW (ACTUAL IMAGE)

COLOR REGISTRATION STRATEGY FOR PREPRINTED FORM

BACKGROUND

1. Field

The present disclosure relates to a method and a system for performing color registration on template media having template markings thereon by taking both light scatter from test pattern and light absorption by the test pattern into account.

2. Description of Related Art

In a continuous feed direct marking printer, e.g., based on solid inkjet technology, multiple printheads are distributed over a long print zone to obtain the desired color and image resolutions. Image Registration and Color Control (IRCC) technology is configured to achieve color to color registration using a closed feedback loop controller. At cycle up of the continuous feed direct marking printer, the closed feedback loop controller is configured to print a registration control target (i.e., test pattern), capture the registration control target using a linear array sensor, analyze the linear array sensor response profile, and determine the x-position and y-position of each printhead. The computed registration errors are corrected by y-registration actuators and x-registration actuators. This IRCC technology has been demonstrated in the continuous feed direct marking printer for a blank paper.

The transaction printing industry uses pre-printed forms. For example, these pre-printed forms are used as medical claim forms, shipping documents, purchase orders, insurance records, etc. These pre-printed forms are used, for example, to add color, logos, etc. to a large market mainly populated by monochrome (i.e., one color or shades of one color) web printers.

The pre-printed rolls are produced using offset technology. In offset technology, inked image is transferred or "offset" from a plate to an intermediate surface (e.g., rubber blanket), and then to the printing surface.

Full color digital web printers with the capability to produce excellent graphics are now being offered. The transition from preprinted forms to execute the entire print job in one machine may take some time, because the transition requires not only substituting monochrome printers but also, for example, changing the workflow, etc.

The use of preprinted forms (or offset "shells") presents a problem for the registration strategy of the continuous feed direct marking printer. That is, setup test pattern (such as color registration test target) that is printed on top of the pre-printed form is confounded with the pre-printed form. This issue (i.e., the registration control target is confounded with the pre-printed form) precludes the actual analysis of the x- and y-positions of the printheads. Further, it is not practical to print the test patterns on blank paper since that would require swapping out the web roll.

The present disclosure provides improvements in registration strategy of preprinted forms.

SUMMARY

According to one aspect of the present disclosure, a computer-implemented method for performing color registration on template media having template markings thereon is provided. The method is implemented in a computer system comprising one or more processors configured to execute one or more computer program modules. The method includes sensing the template media using a sensor positioned along a process path of a web to obtain first image data; printing a test pattern on the template media; sensing the template media along with the test pattern printed thereon using the sensor to obtain second image data; determining an output image data of the test pattern from the first image data, the second image data, and an estimated image data of the template media with the test pattern printed thereon; determining at least one of a process direction misregistration and a cross-process direction misregistration from the output image data; and adjusting at least one of a cross-process position and a process position of printheads based on the process direction misregistration and cross-process direction misregistration to provide adjusted color registration on subsequent template media. The estimated image data is representative of light scatter from the test pattern and light absorption by the test pattern.

According to another aspect of the present disclosure, a system for performing color registration on template media having template markings thereon is provided. The system includes a print engine, a sensor, a processor, and a controller. The print engine is configured to print a test pattern on the template media. The sensor is positioned along a process path of a web. The sensor is configured to sense a) the template media to obtain first image data; and b) the template media along with the test pattern printed thereon to obtain second image data. The processor is configured to a) determine an output image data of the test pattern from the first image data, the second image data, and an estimated image data of the template media with the test pattern printed thereon; and b) determine at least one of a process direction misregistration and a cross-process direction misregistration from the output image data. The controller is configured to adjust at least one of a cross-process position and a process position of printheads based on the process direction misregistration and cross-process direction misregistration to provide adjusted color registration on subsequent template media. The estimated image data is representative of light scatter from the test pattern and light absorption by the test pattern.

According to another aspect of the present disclosure, a computer-implemented method for performing color registration on template media having template markings thereon is provided. The method is implemented in a computer system comprising one or more processors configured to execute one or more computer program modules. The method includes sensing the template media using a sensor positioned along a process path of a web to obtain first image data; printing a test pattern on the template media; sensing the template media along with the test pattern printed thereon using the sensor to obtain second image data; transforming the first image data and the second image data into an absorbance space to obtain a first absorbance and a second absorbance, respectively; determining a difference between the first absorbance and the second absorbance; applying a correction factor to the determined difference to obtain an output absorbance; transforming the output absorbance into a reflectivity space to obtain an output image data; determining at least one of a process direction misregistration and a cross-process direction misregistration from the output image data; and adjusting at least one of a cross-process position and a process position of printheads based on the process direction misregistration and cross-process direction misregistration to provide adjusted color registration on subsequent template media. The output absorbance is representative of absorbance corresponding to the test pattern, the correction factor is representative of light scatter from the test pattern, and the output image data is representative of image data of the test pattern.

Other objects, features, and advantages of one or more embodiments of the present disclosure will seem apparent from the following detailed description, and accompanying drawings, and the appended claims.

BRIEF DESCRIPTION OF THE DRAWINGS

Various embodiments will now be disclosed, by way of example only, with reference to the accompanying schematic drawings in which corresponding reference symbols indicate corresponding parts, in which

FIGS. 8A and 8B illustrate exemplary images of output image data as captured by the linear array sensor in accordance with an embodiment of the present disclosure;

FIGS. 9A and 9B illustrate exemplary images of output image data, after form outline cleaning procedure is performed on the output image data, as captured by the linear array sensor in accordance with an embodiment of the present disclosure;

DETAILED DESCRIPTION

Figure 1:
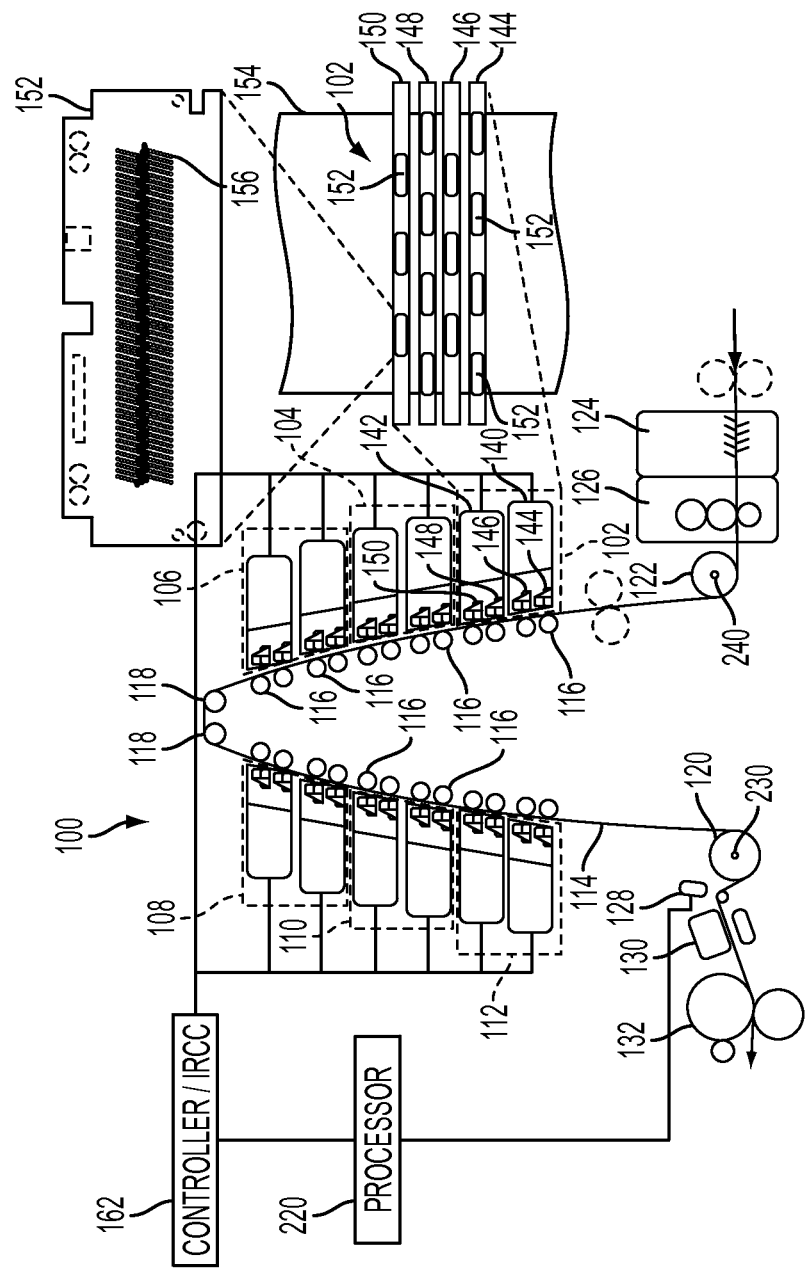
FIG. 1 illustrates a schematic view of a continuous web printing system with twelve print modules along with expanded schematic views showing printheads positioned within print sub-modules and nozzles within a printhead.

When using pre-printed forms (or "offset shells"), the prior art color registration strategy of the continuous feed direct marking printer may fail in some instances. The present disclosure addresses the drawbacks of the prior art color registration strategy.

For example, to correct for an error caused by mis-registration of the (e.g., non-ideal) preprinted form image, the present disclosure proposes additional processing steps. For example, these additional processing steps may include (1) an image registration step that performs form registration between the preprinted form image and the image of CRTT overprinted on the preprinted form, and (2) an edge/outline cleaning step which performs a morphological filtering on the resulting difference image (i.e., image of the CRTT) to clean residual outlines (i.e., while preserving the CRTT dash-lines). These residual outlines may be formed as a result of improper image registration. These additional processing steps are described in detail with respect to the method 300 (shown and explained with respect to FIG. 3). Specifically, the image registration step is described in detail below at procedure 350 of the method 300 and the form outline cleaning step is described in detail below at procedure 370 of the method 300.

The present disclosure proposes replacing the density/absorbance subtraction model (i.e., used in the prior art color registration strategy), for example, by the Kubelka-Munk model that represents bulk scatter in addition to absorption, and optionally by a surface-scatter model. Alternatively, a correction factor may be used to empirically correct for light scatter in the inks or toners of the test pattern. The use of the Kubelka-Munk model and the correction factor are described in detail below at procedure 360 of the method 300.

The present disclosure also proposes replacing global thresholding strategy (i.e., used in the prior art color registration strategy) used to analyze the CRTT image with a local thresholding strategy. As explained in detail below with respect to procedure 390 of the method 300, the local thresholding used in the present disclosure is much more robust to the image content of the preprinted form.

It is contemplated that, for performing color registration on template media having template markings, the present disclosure proposes the usage of either all three of the above described improvements (i.e., (a) the image registration and the edge/outline cleaning steps, (b) the Kubelka-Munk model or the correction factor to correct for light scatter in the inks or toners of the test pattern, and (c) the local thresholding strategy), or one or more of the above described improvements.

FIG. 1 illustrates a continuous web printing system 100. The continuous web printing system 100 includes a print engine, a linear array sensor 128, a processor 220 and a controller 240.

The continuous web printing system 100 also includes a web supply and handling system that is configured to supply a very long (i.e., substantially continuous) web 154 of "substrate" or "media" (e.g., paper, plastic or other printable material) from a spool (not shown). In another embodiment, the web 154 is in the form of an extensible image receiving member, such as a belt, which defines an image receiving surface that is driven in a process direction between print modules of the print engine. The web 154 may be unwound as needed, and propelled by a variety of motors (not shown). The web supply and handling system is capable of transporting the web 154 at a plurality of different speeds. In one embodiment, the web 154 is capable of being moved at any speed between approximately zero inches per second (ips) and approximately 150 inches per second (ips). A set of rolls are configured to control the tension of the unwinding web as the web moves through the path 114.

In the present disclosure, the process direction is the direction in which the web, onto which the image is transferred and developed, moves through the image transfer and developing apparatus. The cross-process direction, along the same plane as the web, is substantially perpendicular to the process direction. In the present disclosure, the x-direction is referred to as the cross-process direction and y-direction is referred to as the process direction.

The print engine of the continuous web printing system 100 includes a series of print (or color) modules 102, 104, 106, 108, 110, and 112, each print module 102, 104, 106, 108, 110, and 112 effectively extending across the width of the web 154 in the cross-process direction. The print engine is configured to print a test pattern on a template media (having template markings thereon). As shown in FIG. 1, the print modules 102, 104, 106, 108, 110, and 112 are positioned sequentially along the in-track axis of a process path 114 defined in part by rolls 116. The process path 114 is further defined by upper rolls 118, leveler roll 120 and pre-heater roll 122. A brush cleaner 124 and a contact roll 126 are located at one end of the process path 114. The linear array sensor 128, a heater 130 and a spreader 132 are located at the opposite end of the process path 114.

Each print module 102, 104, 106, 108, 110, and 112 is configured to provide an ink of a different color. Six print modules are shown in FIG. 1 although more or fewer print modules may be used. In all other respects, the print modules 102, 104, 106, 108, 110, and 112 are substantially identical. Accordingly, while only print module 102 will be further described in detail, such description further applies to the print modules 104, 106, 108, 110, and 112.

Print module 102 includes two print sub modules 140 and 142. Print sub module 140 includes two print units 144 and 146 and print sub module 142 includes two print units 148 and 150. The print units 144 and 148 each include four printheads 152 while the print units 146 and 150 each include three printheads 152. Thus, each of the print sub modules 140 and 142 include seven offset printheads 152. The printheads 152 are offset to provide space for positioning of control components. The use of multiple printheads 152 allows for an image to be printed on the web 154, which is much wider than an individual printhead 152. For example, seven printheads 152, which are each three inches wide, may be used to produce a 20.5 inch image on the web 154, which is 21 inches wide. The print width of the exemplary print module 102 may be increased or decreased by adding or eliminating printheads to each two print sub modules.

Each of the printheads 152 includes sixteen rows of nozzles 156. Each of the nozzles 156 is individually controlled to jet a spot of ink on the web 154. The matrix of nozzles 156 in one embodiment provides a density of 300 nozzles per inch in the cross-process direction of the process path 114. Accordingly, each printhead 152 produces an image with a spot density of 300 spots of ink per inch (SPI).

The provision of two sub modules, such as sub modules 140 and 142, for each of the print modules 102, 104, 106, 108, 110, and 112 provides increased resolution. Specifically, the printheads 152 in the sub modules 142 are offset in the cross-process direction of the process path 114 with respect to the printheads 152 in the sub module 140 by a distance corresponding to the width of a spot or a pixel in a printhead configured to provide 600 SPI. The resultant interlacing of the jets produced by the nozzles 152 generates an image with a 600 SPI resolution. It is contemplated that increasing printing resolutions may be achieved by utilizing single printheads of higher nozzle density.

Figure 2:
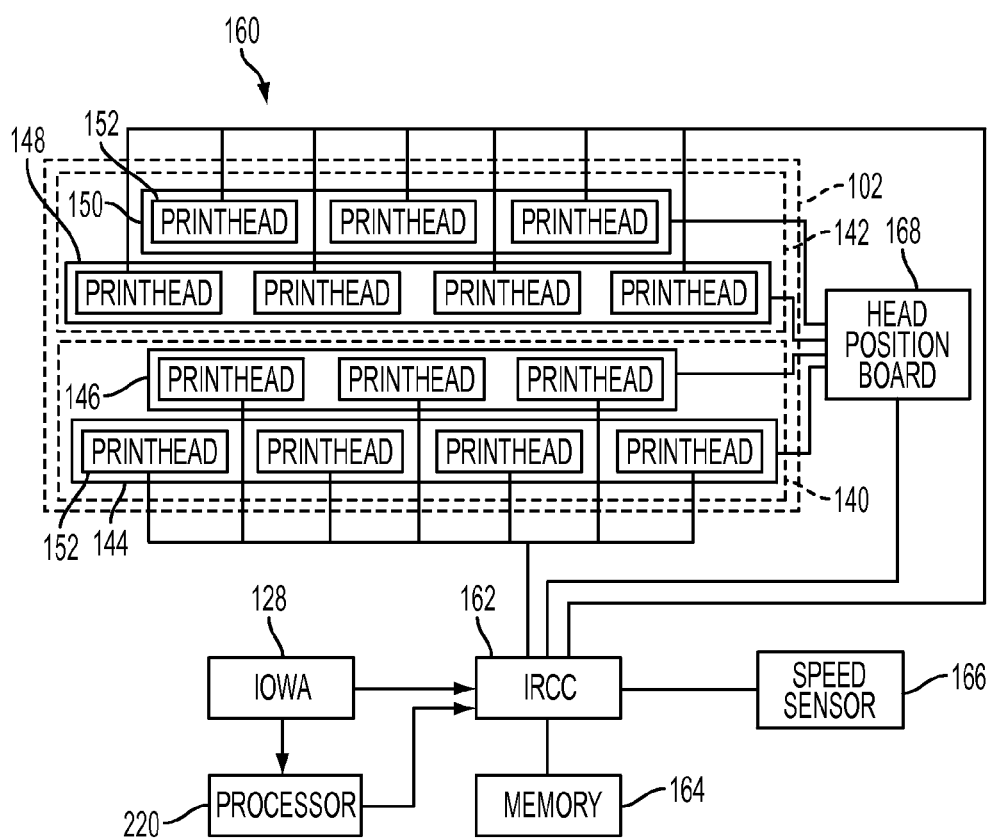
FIG. 2 illustrates a schematic of a control system that may be used with the system of FIG. 1 for performing color registration on template media having template markings thereon in accordance with an embodiment of the present disclosure.

As shown in FIGS. 1 and 2, the multiple printheads are distributed in a print zone over a long span of the web 154. The position of the printheads is determined using the Integrated Registration and Color Control (IRCC) technology. This IRCC technology includes the linear array sensor 128, the processor 220 (i.e., signal processing and control algorithms, and actuator electronics to determine process (y) and cross-process (x) direction distances between printheads), and IRCC board or controller 162 to adjust process (y) and cross-process (x) direction distances between printheads.

Alignment of the print modules 102, 104, 106, 108, 110, and 112 with the process path 114 is controlled by a control system 160 shown in FIG. 2 (only print module 102 is shown in FIG. 2). The control system 160 may be used with the system of FIG. 1 to control generation and detection of test patterns (or registration patterns) and to control the process position and the cross-process position of printheads.

The control system 160 includes an image registration and color control (IRCC) board or controller 162 and a memory 164. The IRCC board 162 is connected to the linear array sensor 128, the processor 220 and a speed sensor 166, which detects the speed at which the web 154 moves along the process path 114. The IRCC board or controller 162 is further connected to each of the printheads 152 to control jetting of the nozzles 156, and a head position board 168.

The linear array sensor 128 is a full width image contact sensor, which monitors the ink on the web 154 as the web 154 passes under the linear array sensor 128. In general, such a full width linear array sensor can capture the template media (or the pre-printed form) when the printheads are not printing, or can capture the overprinted image for image-quality check. When there is ink on the web 154, the light reflection off the web 154 is low and when there is no ink on the web 154, the amount of reflected light is high. When a pattern of ink is printed by one or more of the printheads 152 under the control of the IRCC board 162, the linear array sensor 128 may be used to sense the printed mark and provide a sensor output to the processor 220. Such a full width array sensor that is used in a printhead registration correction system to achieve the image registration in the direct marking continuous web printers is described in U.S. patent application Publication Ser. No. 12/274,566 (filing date: Nov. 20, 2008), hereby incorporated by reference in its entirety, and hence will not be explained in detail here.

As shown in FIG. 1, the linear array sensor 128 is positioned along the process path 114 (as shown in FIG. 1) of the web 154. When performing the registration strategy for pre-printed forms, a default sensor calibration that is stored in the sensor is used. In contrast, when performing the registration strategy for a blank paper, the sensor calibration is executed during every Cycle Up. In one embodiment, as shown in FIG. 1, the linear array sensor 128 is positioned upstream of the printheads to capture the pre-printed form or template media. The linear array sensor 128 is configured to sense a) the template media to obtain first image data; and b) the template media along with the test pattern printed thereon to obtain second image data.

In one embodiment, the template media is in the form of a continuous web having a plurality of template media. In one embodiment, the template media moves at 300 ft/min for high-quality applications and at 500 ft/min for low-quality applications. A first template media of the continuous web is sensed using the linear array sensor 128 positioned along the process path 114 of the web to obtain the first image data. A second or subsequent template media (with the test pattern printed thereon) of the continuous web is sensed using the linear array sensor 128 positioned along the process path 114 of the web to obtain the second image data.

In other words, the first template media of the continuous web is sensed using the linear array sensor 128 to obtain the linear array sensor response profile of the template media with template markings thereon (i.e., the first image data), then the test pattern is printed on the second or subsequent template media and the second or subsequent template media (i.e., along with the test pattern printed thereon) of the continuous web is sensed using the linear array sensor 128 to obtain the linear array sensor response profile of the template media along with the test pattern printed thereon (i.e., the second image data). The linear array sensor 128 is configured to provide the first image data and the second image data to the processor 220.

In one embodiment, the processor 220 can comprise either one or a plurality of processors therein. Thus, the term "processor" as used herein broadly refers to a single processor or multiple processors. In one embodiment, the processor 220 can be a part of or forming a computer system. In one embodiment, the processor 220 can be a part of the image registration and color control (IRCC) board 162 (as shown in FIG. 2).

In one embodiment, the processor 220 is configured to a) determine an output image data of the test pattern from the first image data, the second image data, and an estimated image data of the template media with the test pattern printed thereon; and b) determine a process direction misregistration and a cross-process direction misregistration from the output image data. The estimated image data is representative of light scatter from the test pattern and light absorption by the test pattern.

In another embodiment, the processor 220 is configured to a) transform the first image data and the second image data into an absorbance space to obtain a first absorbance and a second absorbance, respectively; b) determine a difference between the first absorbance and the second absorbance; c) apply a correction factor to the determined difference to obtain an output absorbance; d) transform the output absorbance into a reflectivity space to obtain an output image data; and e) determine a process direction misregistration and a cross-process direction misregistration from the output image data. The output absorbance is representative of absorbance corresponding to the test pattern, the correction factor is representative of light scatter from the test pattern, and the output image data is representative of image data of the test pattern.

The above-mentioned embodiments where the processor 220 is configured to determine the output image data of the test pattern by taking into account light scatter from the test pattern, and to determine the process direction misregistration and the cross-process direction misregistration from the output image data are explained in detail below with respect to procedure 360 of the method 300 (as shown and explained with respect to FIG. 3).

In one embodiment, the processor 220 uses the output image data to determine the cross-process position of the nozzles 156 for the print units 144, 146, 148, and 150 within the print module 102 (along with the nozzles 156 for the print units within the print modules 104, 106, 108, 110, and 112). Based upon the relative positions, the processor 220 determines cross-process corrections for the print units 144, 146, 148, and 150. In other words, the processor 220 is configured to analyze the output image data to determine x-position and y-position of each printhead. In one embodiment, a registration algorithm (i.e., procedures 380, 390 and 395 as shown and explained with respect to FIG. 3) of the processor 220 uses the amplitude of a repeating pattern at the expected spacing between dashes of the test pattern to compute the x-position and y-position of each printhead.

The system and method for determining registration errors in the cross-process direction is described in U.S. Patent Application Publication No. 2008/0062219, hereby incorporated by reference in its entirety, and hence will not be explained in detail here. U.S. patent application Publication Ser. No. 12/274,566 (filing date: No. 20, 2008), hereby incorporated by reference in its entirety, describes a printhead registration correction system and method for use with direct marking continuous web printers. This printhead registration correction system uses a full width array sensor to achieve the image registration in the direct marking continuous web printers. U.S. Patent Application Publication No. 2009/0265950, hereby incorporated by reference in its entirety, describes registration system for a continuous web printer.

In one embodiment, y-registration (i.e., process direction registration) of the image is achieved by a double reflex printing technology that determines jet timing of each printhead based on web motion measured by encoders 230, 240 (as shown in FIG. 1) and tensiometers. The double reflex printing technology is described in U.S. Patent Application Publication No. 2008/0124158, hereby incorporated by reference in its entirety, and hence will not be explained in detail here. This patent application provides a more detailed description of a double reflex printing registration system and different methods of determining the double reflex printing offsets based on time varying changes in tension of the web. The double reflex printing registration system is configured to determine a double reflex printing offset for each printhead positioned along the web path which may be used to control system 160 to adjust the predetermined actuation time for each printhead so that each image applied by the various printheads is correctly registered on the web to form the desired composite color image.

In one embodiment, the printhead displacement offsets (i.e., process and cross-process direction misregistrations) may be used in conjunction with double reflex printing offsets to adjust actuation times for the printheads to compensate for registration errors that may be introduced due to time varying changes in tension of the web as well as registration errors that may be introduced due to printhead displacement that may occur over a period of time.

The controller or IRCC 162 is configured to adjust a cross-process position and a process position of printheads based on the process direction misregistration and cross-process direction misregistration to provide adjusted color registration on subsequent template media.

The IRCC board or controller 162 receives the process direction misregistration and the cross-process direction misregistration from the processor 220 and then passes the process direction misregistration and the cross-process direction misregistration to the head position board 168, which in turn controls the cross-process position of the print units 144, 146, 148, and 150. In one embodiment, the computed process and cross-process misregistrations are corrected by y-registration actuators and x-registration actuators. The position of the print units 144, 146, 148, and 150 may be individually controlled using stepper motors configured to change the location of the associated print units 144, 146, 148, or 150 in one micron increments. Alternatively, piezoelectric motors may be used to reduce the potential for backlash when changing direction of the motors.

Figure 3:
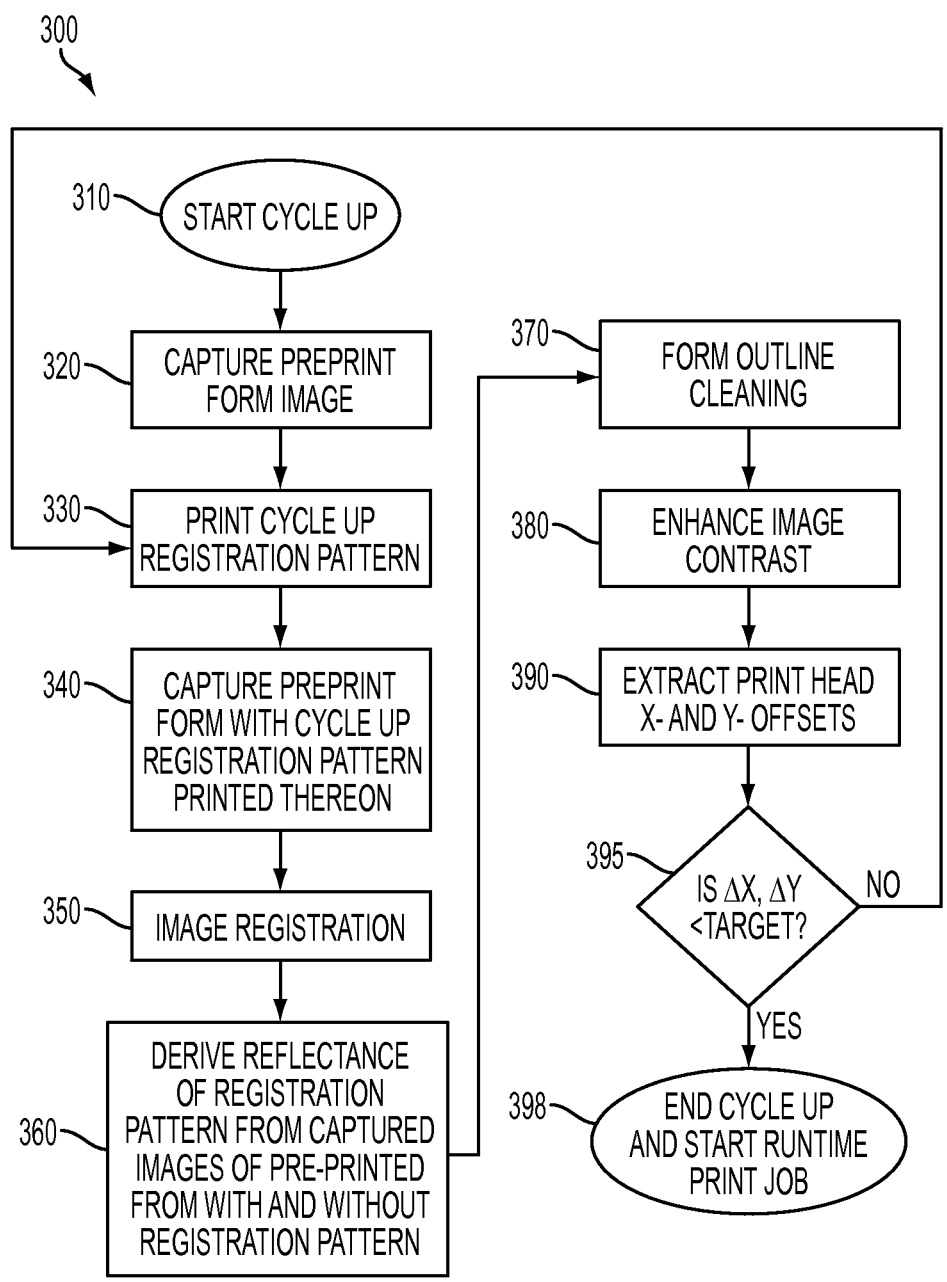
FIG. 3 illustrates a method for performing color registration on the template media having template markings thereon by taking both light scatter from test pattern and light absorption by the test pattern into account in accordance with an embodiment of the present disclosure.

FIG. 3 illustrates the method 300 for performing color registration on template media having template markings thereon by taking both light scatter from the test pattern and light absorption by the test pattern into account. The method 300 is a computer-implemented method that is implemented in a computer system comprising one or more processors 220 (as shown in and explained with respect to FIGS. 1 and 2) configured to execute one or more computer program modules.

The method 300 includes, during Cycle Up, sensing a blank preprinted form using the linear array sensor 128, printing the control registration test target (or test pattern) on a subsequent and identical blank preprinted form, sensing the preprinted form with the control registration test target printed thereon using the linear array sensor 128, using optical models incorporating bulk light scatter (e.g., Kubelka-Munk model) and/or surface light scatter (e.g., the optical model disclosed in "The Effect of Gloss on Color" by E. N. Dalal and K. Natale-Hoffman, *Color Res. & App.*, 24, 369-376, 1999, incorporated herein by reference) to obtain the reflectance of the control registration test target and executing the IRCC (i.e., Image Registration and Color Control) analysis on the obtained control registration test target image. Alternatively, instead of using optical models incorporating bulk light scatter and/or surface light scatter, the method 300 is configured to use a correction factor to empirically correct for light scatter in the inks or toners of the test pattern.

Figure 5:
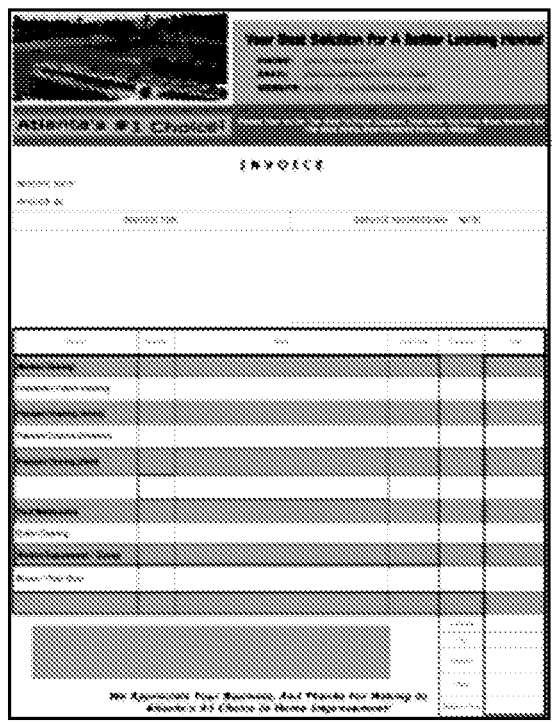
FIG. 5 illustrates an exemplary image of the template media having template markings thereon as captured by a linear array sensor in accordance with an embodiment of the present disclosure.

The method 300 begins at procedure 310, where cycle up of the continuous web printing system 100 is started. The method 300 then proceeds to procedure 320. At procedure 320, the template media having template markings thereon is sensed using the linear array sensor 128 positioned along the process path 114 of a web to obtain first image data. In one embodiment, such linear array sensor may be positioned upstream of the printheads to capture the template media (or the pre-printed form). FIG. 5 illustrates a simulated image capture of the template media (i.e., with template markings thereon) by the linear array sensor 128. The first image data is a linear array sensor response profile of the template media with template markings thereon.

Figure 4:
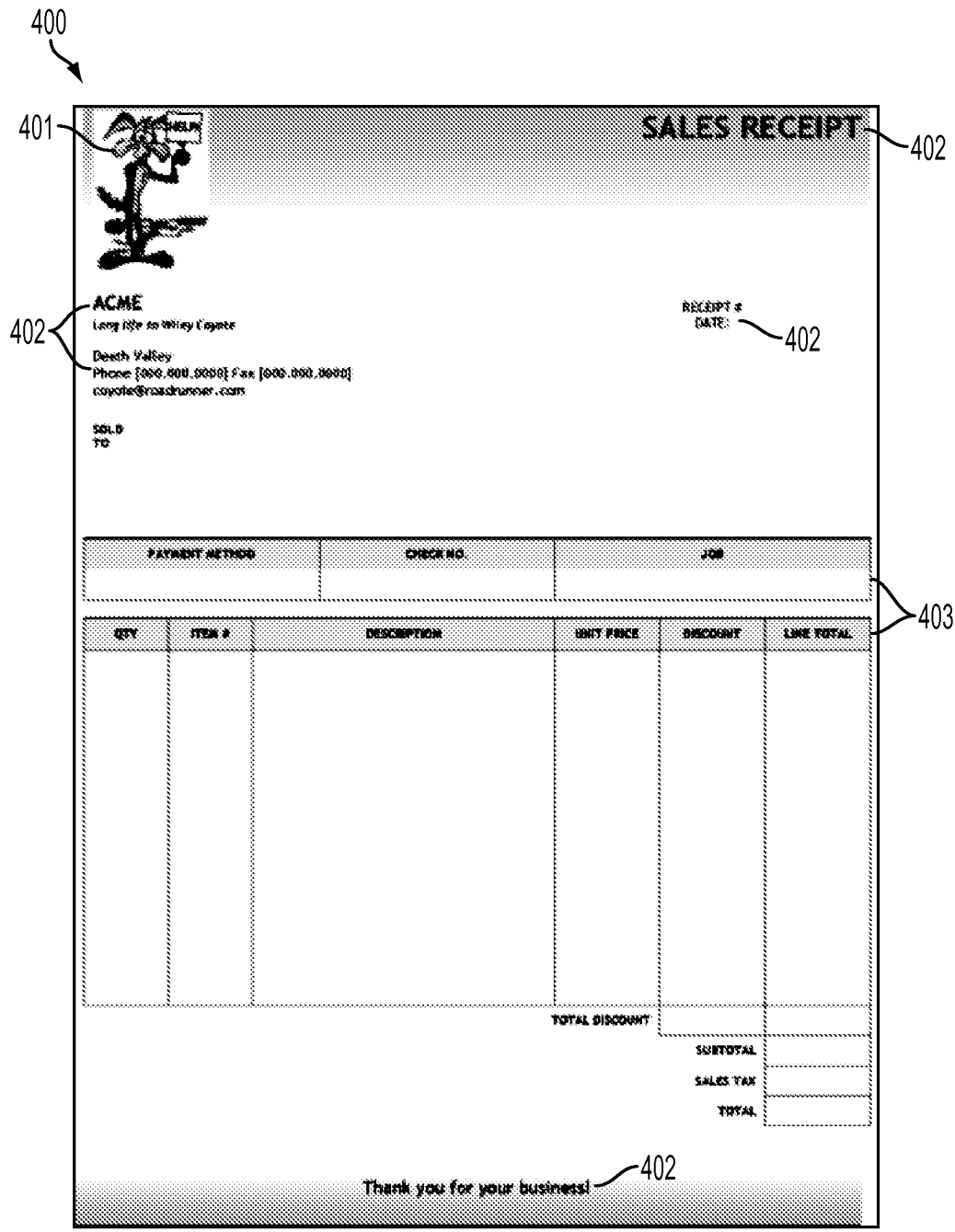
FIG. 4 illustrates an exemplary template media having template markings thereon in accordance with an embodiment of the present disclosure.
Figure 6:
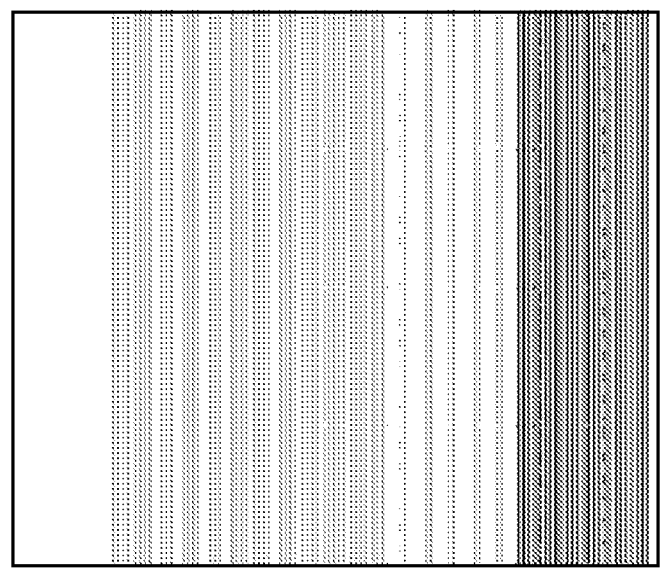
FIG. 6 illustrates an exemplary image of a test pattern printed on a blank paper as captured by the linear array sensor in accordance with an embodiment of the present disclosure.

An exemplary template media 400 having template markings thereon is illustrated in FIG. 4. The exemplary template media 400 as shown in FIG. 4 is a pre-printed form of a sales receipt. In one embodiment, as shown in FIG. 4, the template markings include form images 401, marks, report formats, banners, logos 401, letterhead, data heading for spaces for data, pre-printed text 402, pre-printed boxes 403, pre-printed lines, and/or questions with corresponding spaces for answers. FIG. 6 illustrates a simulated image capture of a test pattern printed on a blank paper by the linear array sensor 128.

At procedure 330, during cycle up, a test pattern is printed on the template media 500. In one embodiment, the test pattern may include a plurality of dashes, the dashes being process direction dashes. The test pattern may include repeated single pixel dashes or dash lines (e.g., 20 to 25 pixels long), addressing all the printheads in the system. In one embodiment, the test pattern may include 1-on and 4-off dash lines.

Figure 7:
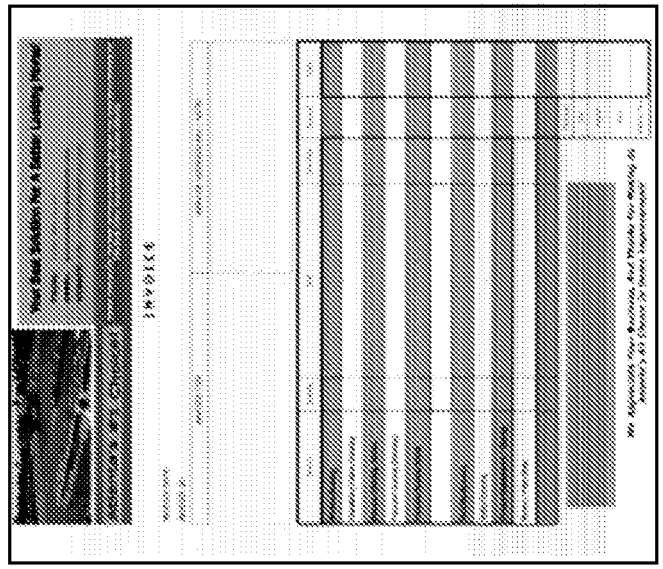
FIG. 7 illustrates an exemplary image of the template media with the test pattern printed thereon as captured by the linear array sensor in accordance with an embodiment of the present disclosure.

The method 300 then proceeds to procedure 340, where the template media along with the test pattern printed thereon is sensed or captured using the linear array sensor 128 to obtain second image data. The second image data is a linear array sensor response profile of the template media along with the test pattern printed thereon. FIG. 7 illustrates a simulated captured template media along with the test pattern printed thereon. For illustrative purposes, a monochromatic linear array sensor was used to capture the exemplary images shown in FIGS. 5-7.

In one embodiment, the template media is in the form of a continuous web having a plurality of template media. A first template media of the continuous web is sensed using the linear array sensor 128 positioned along the process path 114 of the web to obtain the first image data. A second or subsequent template media (with the test pattern printed thereon) of the continuous web is sensed using the linear array sensor 128 positioned along the process path 114 of the web to obtain the second image data.

In other words, the first template media of the continuous web is sensed using the linear array sensor 128 to obtain the linear array sensor response profile of the template media with template markings thereon, then the test pattern is printed on the second or subsequent template media and the second or subsequent template media (i.e., along with the test pattern printed thereon) of the continuous web is sensed using the linear array sensor 128 to obtain the linear array sensor response profile of the template media along with the test pattern printed thereon.

Optionally, at procedure 350, the method 300 is configured to perform image registration between the first input image data and the second input image data by aligning reference points on the first input image data with reference points on the second input image data. This image registration procedure is configured to remove the noises caused by preprinted form differences in the web roll as well as the paper to sensor mis-registration due to Motion Quality (MQ). These preprinted form differences in the roll are caused by, for example, imperfect preprinted form, Image-On-Paper (IOP), MQ, etc.

In one embodiment, the image registration procedure is performed by aligning the reference points (i.e., anchor points/objects) between the first input image data and the second input image data. For example, such reference points may include corners, boxes, lines, and edges that are likely to be present in the template media or the preprinted form.

In one embodiment, the reference points may be pre-selected offline (since the preprinted form is the same for the whole roll of paper). The pattern matching techniques may be used in real-time to locate these pre-selected reference points on captured images for image registration.

In another embodiment, a pre-defined list of characteristics (e.g., a cross-mark, a circular dot, a L-shaped mark, etc) that are likely to occur in the preprinted forms are stored in a database. Reference points may be identified in real-time with these pre-defined list of characteristics. These pre-defined list of characteristics are chosen such that they occur in the preprinted forms but are not exhibited on the CRTT (single-pixel lines with known length and known on-off frequency). This database may be constantly updated with new characteristics.

In yet another embodiment, reference points may be identified in a real-time with the pre-defined list of characteristics. If the reference points are not identified in the pre-defined list of characteristics, then the reference points may be selected offline (since the preprinted form is the same for the whole roll of paper).

At procedure 360, the method 300 is configured to derive output image data of the test pattern from the first image data and the second image data by taking light scatter from the test pattern and light absorption of the test pattern into account.

The output image data of the test pattern may be obtained using two approaches. As will be clear from the discussions below, in the first approach, a correction factor is used to empirically correct for light scatter in the inks or toners of the test pattern. In the second approach, the Kubelka-Munk model is used to represent light scatter in the inks or toners of the test pattern.

In the first approach, the method 300 is configured to transform the first image data and the second image data first into an absorbance space to obtain a first absorbance and a second absorbance, respectively. In the first approach, an RGB sensor or a monochromatic sensor may be used.

The first absorbance is obtained by taking a decimal logarithm for the first image data (i.e., in reflectivity space), according to the Equation (1):

$$A_F(x, y) = -\log_{10}[R_F(x, y)] \quad \text{Equation (1)}$$

where $A_F(x, y)$ is the first absorbance; and
$R_F(x, y)$ is the first image data.

In other words, $R_F(x, y)$ is the reflectance of the template media, without the test pattern printed thereon, as sensed by the sensor at location (x, y), and $A_F(x, y)$ is the corresponding absorbance at that location.

The second absorbance is obtained by taking a decimal logarithm for the second image data (i.e., in reflectivity space), according to the Equation (2):

$$A(x, y) = -\log_{10}[R(x, y)] \quad \text{Equation (2)}$$

where $A(x, y)$ is the second absorbance; and
$R(x, y)$ is the second image data.

In other words, $R(x, y)$ is the reflectance of the template media along with the test pattern printed thereon, as sensed by the sensor at location (x, y), and $A(x, y)$ is the corresponding absorbance at that location.

It should be appreciated that the foregoing equations (i.e., Equation (1) and Equation (2)) denote the conversion of the linear array sensor response profiles from a pure reflectivity space (e.g., a color space such as RGB) to a density space.

It should be also appreciated that the image data is transformed into the absorbance space so as to subtract the absorbances of the two images (i.e., the template media, and the template media with the test pattern printed thereon) and obtain the output absorbance (i.e., absorbance of the test pattern). In other words, the reflectivity is not an additive quantity and is generally in a percentage form, thus, the data in the reflectivity space is not subtracted. Therefore, the image data is converted into absorbance space to calculate the difference between the captured images (i.e., captured template media (or the first image data, as shown in FIG. 5) and the captured template media along with the test pattern printed thereon (or the second image data, as shown in FIG. 7)).

After transforming the image data into the absorbance space, the method 300 is configured to a) determine a difference between the first absorbance $A_F(x, y)$ and the second absorbance $A(x, y)$, and b) apply a correction factor $f[A(x, y), A_F(x, y)]$ to the determined difference to obtain an output absorbance. The output absorbance is representative of absorbance corresponding to the test pattern. The output absorbance is determined according to the Equation (3):

$$A_T(x, y) = [A(x, y) - A_F(x, y)] - f[A(x, y), A_F(x, y)] \quad \text{Equation (3)}$$

where $A_T(x, y)$ is the output absorbance;
$A_F(x, y)$ is the first absorbance;
$A(x, y)$ is the second absorbance; and
$f[A(x, y), A_F(x, y)]$ is the correction factor.

In one embodiment, the correction factor is a function of the first absorbance and the second absorbance and is representative of light scatter from the test pattern.

In one embodiment, an off-line calibration procedure is first performed (i.e., before the real-time measurements) to determine the correction factor. During this off-line calibration procedure, solid (100%) patches of, for example, C, M, Y, and K inks (i.e., in case of CMYK color model) are printed over various colors of the template media and over the bare substrate. This off-line calibration procedure yields a measured absorbance of the test pattern printed over the bare substrate, $A_{Tj}$ as a function a) a measured absorbance of the test pattern printed over the template media, $A_{ij}$ and b) a measured absorbance of the template media without a test pattern printed thereon, $A_{Fi}$. The correction factor, $f[A_{ij}, A_{Fi}]$ is obtained using the Equation (4):

$$T_{Tj} = A_{ij} - A_{Fi} - f[A_{ij}, A_{Fi}] \quad \text{Equation (4)}$$

where $f[A_{ij}, A_{Fi}]$ is the correction factor relative to a simple non-scattering model;
i represents various preprinted colors (e.g., i=1~n) of the template media;
j represents various inks or toners (e.g., C, M, Y or K) of the test pattern;
$A_{Fi}$ is the measured absorbance of the various preprinted colors of the template media (i.e., without a test pattern printed thereon);
$A_{Tj}$ is the measured absorbance of the various inks of the test pattern printed over the bare substrate; and
$A_{ij}$ be the measured absorbance of the various inks or toners of the test pattern printed over the template media with the various preprinted colors (e.g., i=1~n).

In the Equation (4), a color system having a set of inks or toners j, such as cyan, yellow, magenta, black (CMYK) is used by the image printing device for printing a test pattern. However, it is contemplated that any other color system having set of N inks or toners (e.g., N>3), for example CMYKOV, CMYKO, CMYKOG, CcMmYK, or CMYKOB may be used by the image printing device for printing the test pattern.

After obtaining the output absorbance $A_T(x,y)$ from Equation (3), the method 300 is then configured to transform the output absorbance $A_T(x, y)$ into a reflectivity space to obtain an output image data. The output image data is representative of image data of the test pattern. The output image data is obtained by taking an exponential function of the output absorbance, according to the Equation (5):

$$R_T(x,y) = 10^{[-A_T(x,y)]} \quad \text{Equation (5)}$$

where $R_T(x, y)$ is the output image data; and
$A_T(x, y)$ is the output absorbance.

It should be appreciated that the foregoing equation (i.e., Equation (5)) converts absorbance (i.e., corresponding to the test pattern) in the density space to the image data of the test pattern in the reflectivity space (i.e., its original color space).

In the second approach, the method 300, at procedure 360, is configured to determine an output image data of the test pattern from the first image data, the second image data, and an estimated image data of the template media with the test pattern printed thereon. The estimated image data is representative of light scatter from the test pattern and light absorption by the test pattern.

In this second approach, a spectral sensor is used. In one embodiment, the first image data and the second image data may be obtained at each wavelength in the spectral range of the sensor. In another embodiment, the first image data and the second image data may be obtained at some pre-selected wavelengths (i.e., subset of the spectral range of the sensor). In this approach, the first image data and the second image data may be obtained at each location (x, y) of the sensor, where x is the cross-process direction and y is the process direction.

In one embodiment, the estimated image data of the template media with the test pattern printed thereon for each ink or color of the test pattern is determined using equations (6) and (7).

Specifically, the estimated image data of the template media without any ink or color of the test pattern printed thereon is obtained using Equation (6). In other words, in Equation (6), j is equal to 0 corresponding to no ink or toner in the test pattern.

$$R_j(x, y) = R_F(x, y) \quad \text{Equation (6)}$$

where $R_j(x, y)$ is the estimated image data of the template media without the test pattern printed thereon (i.e., for no ink (or toner) of the test pattern, or j=0);

j corresponds to inks or toners of the test pattern, and j=0; and $R_F(x, y)$ is the first image data;

In other words, $R_F(x, y)$ is the reflectance of the template media, without the test pattern printed thereon, as sensed by the sensor at location (x, y).

The estimated image data of the template media with various toners or inks of the test pattern printed thereon is obtained using Equation (7). In other words, in Equation (7), j is greater than 0 corresponding to various inks or toners in the test pattern.

$$R_j(x, y) = \frac{1 - R_F(x, y) * [a_j - b_j * \coth(b_j S_j X)]}{a_j - R_F(x, y) + b_j * \coth(b_j S_j X)} \quad \text{Equation (7)}$$

where $R_j(x, y)$ is the estimated image data of the template media with the test pattern printed thereon for each ink or toner, j in the test pattern;

j corresponds to each toner or ink, j in the test pattern, and j>0;

$R_F(x, y)$ is the first image data;

$a_j$ is a predetermined value;

$b_j$ is a predetermined value;

$S_j$ is a predetermined value and is representative of light scatter from the test pattern;

coth is the hyperbolic cotangent function; and

X is thickness of the color and is set to be 1.

In this second approach, an off-line characterization of the absorption and scattering of the various inks or toners (e.g., C, M, Y, and K inks) in the test pattern is performed, for example, using the Kubelka-Munk model to determine $a_k$, $b_j$, and $S_j$. $a_j$, $b_j$, and $S_j$ are determined using the Equation (8). As can be clearly seen from Equation (8) below, the predetermined values $a_j$, and $b_j$ are functions of $K_j$ (i.e., light absorbance) and $S_j$ (i.e., light scatter).

In general, at each wavelength of light, Kubelka-Munk model relates the light absorption and the light scattering behavior of a material to its reflectivity. The Kubelka-Munk equation may be written in several forms. The commonly used "coth" form is given by Equation (8).

$$R_j = \frac{1 - R_g * [a_j - b_j * \coth(b_j S_j X)]}{a_j - R_g + b_j * \coth(b_j S_j X)} \quad \text{Equation (8)}$$

$$R_j = \frac{1 - R_g * [a_j - b_j * \coth(b_j S_j X)]}{a_j - R_g + b_j * \coth(b_j S_j X)}$$

where $a_j = 1 + \left(\frac{K_j}{S_j}\right) a_j = 1 + \left(\frac{K_j}{S_j}\right)$;

$b_j = \sqrt{a_j^2 - 1} \, b_j = \sqrt{a_j^2 - 1}$;

$R_g$ is the reflectance of the bare substrate;

$R_j$ are the reflectances of the inks j (i.e., j=1-4 corresponding to C, M, Y or K) printed on that substrate;

$K_j$ is the absorbance of the ink j;

$S_j$ is the scatter of the ink j;

coth is the hyperbolic cotangent function; and

X is the thickness of the ink, and is set to 1.

To determine $a_j$, $b_j$, and $S_j$ in Equation (7), the off-line characterization of the absorption and scattering of the various inks or toners (e.g., C, M, Y, and K inks) in the test pattern is performed. This is done, for example, by printing solid (100%) patches of the various inks or toners (e.g., C, M, Y, and K inks) in the test pattern over at least a white substrate and a black substrate. The spectral measurements are made over a range of wavelengths, for example, from 400 nm to 700 nm in 10 nm increments.

All the terms in Equation (8), except for X, are spectra, and are treated independently at each wavelength λ.

If the $R_g$ and $R_j$ spectra are measured, then at each wavelength λ for each ink j there are only two unknowns, $K_j$ and $S_j$, in Equation (8). Therefore, performing the measurements on two different substrates, such as a white substrate and a black substrate, yields two equations which may be solved for the two unknowns $K_j$ and $S_j$. If more than two substrates are used, the two unknowns $K_j$ and $S_j$ may be determined more robustly, for example, by a regression procedure.

Once the predetermined values (i.e., $a_j$, $b_j$, and $S_j$) are determined from Equation (8), these values are used in Equation (7) to determine the estimated image data (i.e., $R_j(x,y)$) of the template media with the test pattern printed thereon for each ink or toner, j in the test pattern.

In the Equations (7) and (8), a color system having a set of inks or toners j, such as cyan, yellow, magenta, black (CMYK) is used by the image printing device for printing a test pattern. However, it is contemplated that any other color system having set of N inks or toners (e.g., N>3), for example CMYKOV, CMYKO, CMYKOG, CcMmYK, or CMYKOB may be used by the image printing device for printing the test pattern.

After determining the estimated image data (i.e., $R_j(x,y)$) of the template media with the test pattern printed thereon for each ink or toner, j in the test pattern, the method 300 is configured to compare the second image data with the estimated image data obtained for each ink or toner in the test pattern to identify the estimated image data for one ink or toner that closely matches the second image data. In other words, the spectrum of the reflectance of the template media (i.e., R(x,y)), with the test pattern printed thereon, as sensed by the sensor at location (x,y) is compared with the five spectra (i.e., j=0 for no ink, and j=1-4 corresponding to C, M, Y, or K inks) for the estimated image data (i.e., $R_j(x,y)$) to identify the closest match between them (i.e., R(x, y) and $R_j(x,y)$). In one embodiment, identifying the closest match is done, for example, by minimizing the least-squares error.

If the closest match corresponds to j=J, then the spectrum of the reflectance of the test pattern, as sensed by the sensor at location (x, y) (i.e., $R_T(x, y)$) given by Equation (9).

$$R_T(x, y) = \frac{1 - R_P * [a_J - b_J * \coth(b_J S_J X)]}{a_J - R_P + b_J * \coth(b_J S_J X)} \quad \text{Equation (9)}$$

where $R_T(x, y)$ is output image data of the test pattern;

$R_P$ is an image data of a bare substrate;

J is an ink or toner in the test pattern where the estimated image data closely matches the second image data.

$a_J$ is a predetermined value and is equal to $$1 + \left(\frac{K_J}{S_J}\right)$$

$b_J$ is a predetermined value and is equal to $\sqrt{a_J^2 - 1}$ $K_J$ is a predetermined value and is light absorbance of the test pattern;

$S_J$ is a predetermined value and is the light scatter from the test pattern;

coth is the hyperbolic cotangent function; and

X is thickness of the color and is set to 1.

In Equation (9), $a_J$, $b_J$, $K_J$, and $S_J$ are predetermined values that are determined using Equation (8) at j=J.

In one embodiment, some pre-processing of the measured reflectance spectra (i.e., R(x, y)) may be performed. For example, such pre-processing may include Saunderson correction for reflection at interfaces.

FIGS. 8A and 8B illustrate exemplary images captured by the linear array sensor after the procedure 360 of the method 300.

Specifically, FIG. 8A illustrates an exemplary output image data 806 obtained after a perfect image registration (i.e., at procedure 350) between the first image data (i.e., FIG. 5) and the second image data (i.e., FIG. 7). As can be seen in FIG. 8A, when a perfect image registration between the first image data and the second image data is achieved, there are no residual errors in the output image data 806.

In contrast, FIG. 8B illustrates an exemplary output image data 808 obtained after an imperfect image registration (i.e., at procedure 350) between the first image data (i.e., FIG. 5) and the second image data (i.e., FIG. 7). As can be seen in FIG. 8B, the output image data 808, for example, is off by one pixel in cross-process direction and two pixels in process direction. This imperfect image registration between the first image data and the second image data resulted in residual errors 802 and 804 in the output image data 808 as shown in FIG. 8B.

To remove any residual errors (i.e., resulted from an imperfect image registration), the method 300, at procedure 370, is configured to optionally perform a form outline cleaning procedure. These residual errors in the output image data are removed while preserving the CRTT image.

In one embodiment, morphological filters with a defined structure (e.g., that excludes the elements that resemble CRTT) may be used to perform the form outline cleaning procedure. In other words, the morphological filters with the defined structure are configured to clean out everything except elements that looks like single pixel lines of known length.

Morphological filtering techniques generally include erosion and/or dilation steps. Various morphological filtering techniques, including erosion and dilation of an image, are disclosed, for example, in *Computer and Robot Vision* Vol. I by Haralick, R. M and L. G. Shapiro, Addison-Wesley Publishing, 1992, pp. 158-205; and in "Methods for Fast Morphological Image Transforms Using Bitmapped Images," *Computer Vision, Graphics, and Image Processing: Graphical Models and Image Processing*, van den Boomgard, R, and R. van Balen, Vol. 54, Number 3, pp. 254-258, May 1992, herein incorporated by reference in their entirety.

In another embodiment, an edge detection is performed on the output image data and any pixels around these edge pixels are discounted. This edge detection technique (i.e., for removing residual errors) is a passive approach but works well when the error in image registration is within a pixel or two pixels.

FIGS. 9A and 9B illustrate exemplary images captured by the linear array sensor after the form outline cleaning procedure (i.e., procedure 370) of the method 300.

Specifically, FIG. 9A illustrates an exemplary image 906 that is obtained after performing the form outline cleaning procedure on the image 806. As can be seen in FIGS. 8A and 9A, when a perfect image registration between the first image data and the second image data is achieved, there are no residual errors in the output image data 806, and hence the form outline cleaning procedure need not be performed. In other words, the form outline cleaning procedure (i.e., the procedure 370) is a null-process, when a perfect image registration (at the procedure 350) is achieved.

In contrast, FIG. 9B illustrates an exemplary image 908 that is obtained after performing the form outline cleaning procedure on the image 808. During the form outline cleaning procedure on the image 808, a series of "open" filtering were used to remove structure elements that are larger than 5×5, 30×1, or 1×10 array of pixels. By comparing FIG. 8B with FIG. 9B, it is clear that the form outline procedure (i.e., procedure 370) of the method 300 improved the resulting image 908 of the test pattern. It is contemplated that the structure elements may be further optimized for individual preprinted forms. It can be seen from FIGS. 8A-9B that the form outline cleaning procedure improves the resulting image in all cases except in the case where a perfect image registration is achieved.

At procedure 380, the method 300 is configured to provide digital image enhancement to the output image data (i.e., image data of the test pattern). This image enhancement may include improving image contrast by reducing additional noise. Image processing algorithms for improving the image contrast are for example described in detail in "Contrast Limited Adaptive Histogram Equalization," Graphic Gems IV, San Diego: Academic Press Professional, 1994. 474-485, by Karel Zuiderveld, hereby incorporated by reference in its entirety, and hence will not be explained in detail here.

At procedure 390, the method 300 is configured to determine a process direction misregistration and a cross-process direction misregistration from the output image data (i.e., image data of the test pattern).

The system and method for determining registration errors in the cross-process direction is described in U.S. Patent Application Publication No. 2008/0062219, hereby incorporated by reference in its entirety, and hence will not be explained in detail here. U.S. patent application Publication Ser. No. 12/274566 (filing date: Nov. 20, 2008), hereby incorporated by reference in its entirety, describes a printhead registration correction system and method for use with direct marking continuous web printers. This printhead registration correction system uses a full width array sensor to achieve the image registration in the direct marking continuous web printers. U.S. Patent Application Publication No. 2009/0265950, hereby incorporated by reference in its entirety, describes registration system for a continuous web printer.

In one embodiment, y-registration (i.e., process direction registration) of the image is achieved by a double reflex printing technology that determines jet timing of each printhead based on web motion measured by encoders 230, 240 (as shown in FIG. 1) and tensiometers. The double reflex printing technology is described in U.S. Patent Application Publication No. 2008/0124158, hereby incorporated by reference in its entirety, and hence will not be explained in detail here. This patent application provides a more detailed description of a double reflex printing registration system and different methods of determining the double reflex printing offsets based on time varying changes in tension of the web. The double reflex printing registration system is configured to determine a double reflex printing offset for each printhead positioned along the web path which may be used to control system 160 (as shown in FIG. 2) to adjust the predetermined actuation time for each printhead so that each image applied by the various printheads is correctly registered on the web to form the desired composite color image.

In one embodiment, the printhead displacement offsets (i.e., process and cross-process direction misregistrations) may be used in conjunction with double reflex printing offsets to adjust actuation times for the printheads to compensate for registration errors that may be introduced due to time varying changes in tension of the web as well as registration errors that may be introduced due to printhead displacement that may occur over a period of time.

At the procedure 390, the method is configured to obtain a profile in the cross-process direction and a profile in the process direction. Centriods are identified on each of these profiles to obtain the x offset and the y-offset of the printhead, respectively.

For example, during the extraction of the x-offset of the printhead, the method 300 is configured to average the reflectances $R_T(x, y)$ of the derived CRTT image (i.e., output image data) along y (or process) direction to obtain the profile p(x) in the cross-process direction. The profile in the cross-process direction is given by the Equation (11).

$$p(x) = \frac{1}{\text{count}(y)} \sum_y R_T(x, y) \qquad \text{Equation (11)}$$

where $R_T(x, y)$ be the reflectance of the output image data at location (x, y), where x is the cross-process direction and y is the process-direction;
p(x) is the profile in the cross-process direction;
$\Sigma$ is the summation function; and
count ( ) is the count function.

Once the profile in the cross-process direction is obtained, centroids of the CRTT's are identified to obtain the x offset of the printhead. An equation similar to Equation (11) may be used to derive a profile in the process direction, and hence the y-offset of the printhead.

In the prior art, CRTT lines were analyzed as group with a global thresholding strategy to identify the centroids of the CRTT's. Though a filtering step was applied prior to the global thresholding strategy to remove background non-uniformity due to printer and/or sensor, this filtering step is not effective enough to deal with the "background non-uniformity" caused by the image content of the template media or the preprinted forms. In the prior art, centroids of the CRTT's are identified by calculating a threshold $\eta$. For example, the threshold $\eta$ is set globally for entire profile p(x) regardless of position x (i.e., in the cross-process direction). The threshold $\eta$ may be obtained using Equation (12).

$$\eta = (\max(p(x)) + \min(p(x))/2 \qquad \text{Equation (12)}$$

where $\eta$ is the threshold;
p(x) is the profile in the cross-process direction; and
max( ) and min( ) represent maximum and minimum functions of the profile in the cross-process direction, respectively.

The max and min values of the profile p(x) in Equation (12) may also be replaced with 95-percentile and 5-percentile of the profile p(x), respectively.

Figure 10A:
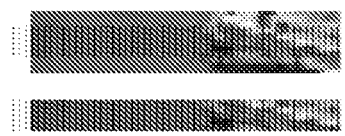
FIG. 10A illustrates a zoom-in view of an area (i.e., upper left corner) of the exemplary image illustrated in FIG. 7 showing the dash lines of the test pattern printed on the template media in accordance with an embodiment of the present disclosure.
Figure 10B:
FIG. 10B illustrates a zoom-in view of an area (i.e., upper left corner) of the exemplary image illustrated in FIG. 6 showing the lines of the test pattern printed on the blank paper in accordance with an embodiment of the present disclosure.

FIG. 10A illustrates a zoom-in view of an area (i.e., upper left corner) of the exemplary image illustrated in FIG. 7 showing the lines of the test pattern printed on the template media and FIG. 10B illustrates a zoom-in view of an area (i.e., upper left corner) of the exemplary image illustrated in FIG. 6 showing the lines of the test pattern printed on the blank paper. Though the image of the captured template media with CRTT are shown in FIG. 10A it is contemplated that an image of the derived CRTT image obtained after procedure 360 in the method 300 may be used.

Figure 11A:
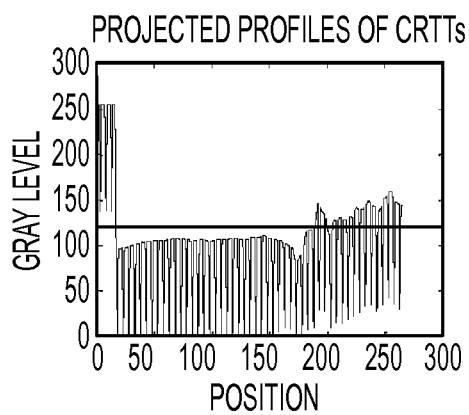
FIGS. 11A and 11B illustrate exemplary profiles of the two-sub regions of interest of the areas shown in FIGS. 10A and 10B, respectively after a global thresholding strategy is performed.
Figure 11B:
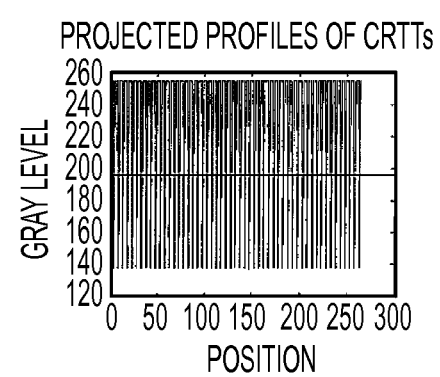

FIGS. 11A and 11B illustrate exemplary profiles (i.e., p(x) in the cross-process direction) of the two-sub regions of interest of the areas shown in FIGS. 10A and 10B, respectively after a global thresholding strategy is performed. The graphs in FIGS. 11A and 11B illustrates the position (i.e., in the cross-process direction) on a horizontal x-axis. On a vertical y-axis, the graph illustrates the profile in the cross-process direction. As shown in FIGS. 11A and 11B, the global threshold $\eta$ in FIG. 11A is between 100-150 and the global threshold $\eta$ in FIG. 11B is close to 200. Although the global threshold strategy works well for FIG. 11B, the global threshold strategy fails for FIG. 11A in identifying all dash lines (too low for first few lines and too high for the rest) and thus cannot properly extract printhead x-offsets in the case where the image content of the preprinted form was not cleaned up successfully.

In contrast, the method 300 of the present disclosure, at procedure 390, is configured to optionally perform a local thresholding strategy (i.e., as opposed to the global thresholding strategy of the prior art), which first localizes individual CRTT lines or a small set of CRTT lines and then estimates local background as the threshold. In one embodiment, pattern-matching methods are used to isolate each CRTT line (i.e., dash line with known size). The IRCC algorithms are configured for localized processing of these isolated CRTT line(s).

The method 300, at procedure 390, is configured to calculate a local threshold $\eta'$ for each of the multiple regions in the images shown in FIGS. 10A and 10B, where each region includes a small group/set of lines (i.e., color registration test targets). The local threshold $\eta'$ may be calculated using Equation 13.

$$\eta' = (\max(p(x)) + \min(p(x))/2 \qquad \text{Equation (13)}$$

where $\eta'$ is the local threshold for a region having a small group of lines;
p(x) is the profile in the cross-process direction for that region of interest; and
max( ) and min( ) represent maximum and minimum functions of the profile in the cross-process direction for that region of interest, respectively.

For example, for the region between x=1 and x=15, the local threshold $\eta_1'$ is calculated based on profile in that section only. In other words, the local threshold $\eta_1' = (\max(p(x)) + \min(p(x))/2$, where x=1~15. Similarly, for the region between x=91 and x=105, the local threshold $\eta_7'$ is calculated based on profile at that section only. In other words, the local threshold $\eta_7' = (\max(p(x)) + \min(p(x))/2$, where x=91~105.

Figure 12A:
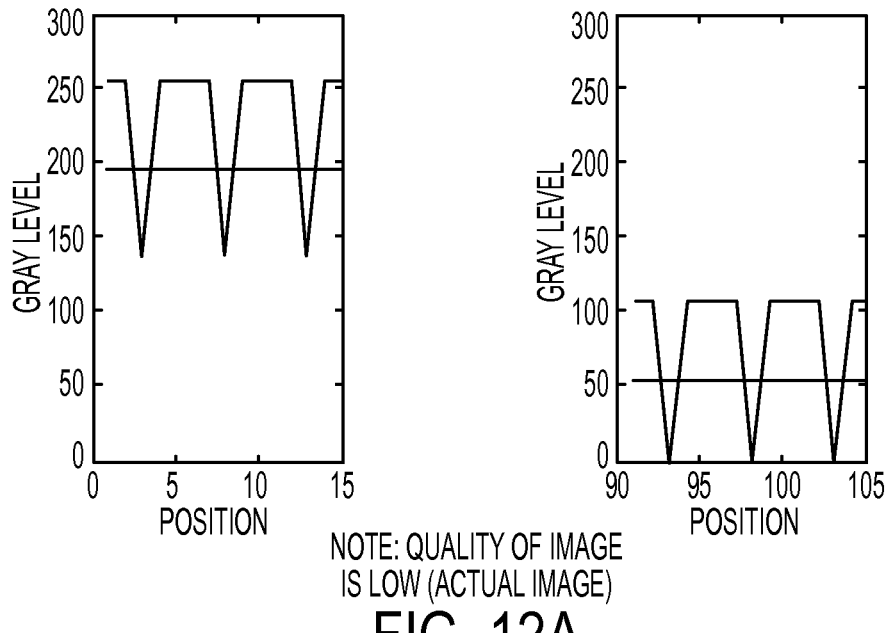
FIGS. 12A and 12B illustrate exemplary profiles of the two-sub regions of interest of the areas shown in FIGS. 10A and 10B, respectively after a local thresholding strategy is performed in accordance with an embodiment of the present disclosure.
Figure 12B:
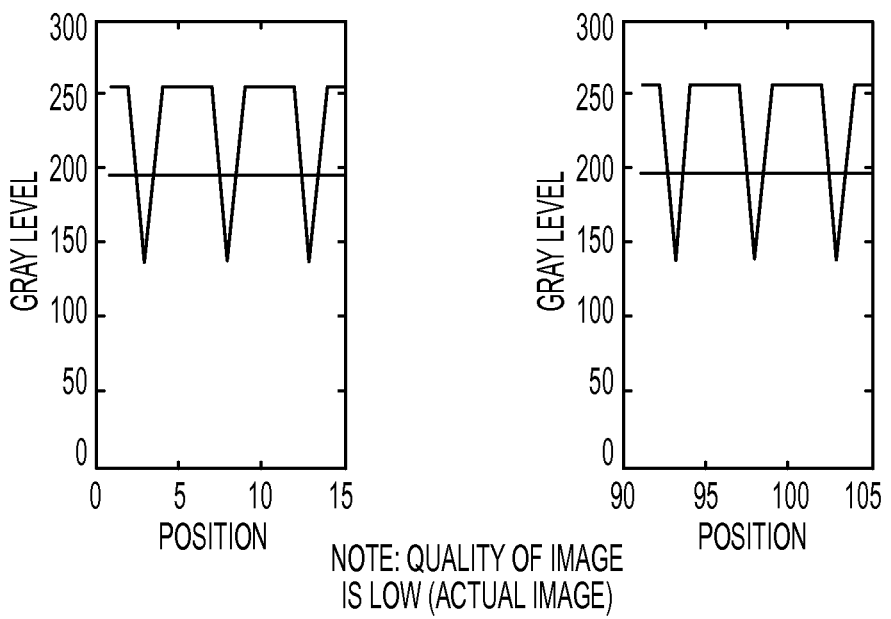

FIGS. 12A and 12B illustrate exemplary profiles (i.e., p(x) in the cross-process direction) of the two-sub regions of interest of the areas shown in FIGS. 10A and 10B, respectively after a local thresholding strategy is performed. The graphs in FIGS. 12A and 12B illustrates the position (i.e., in the cross-process direction) on a horizontal x-axis. On a vertical y-axis, the graph illustrates the profile in the cross-process direction.

As shown in FIG. 12A, the local threshold $\eta_1'$ shown in the first graph of FIG. 12A is close to 200 and the local threshold $\eta_7'$ shown in the second graph of FIG. 12A is close to 50. As shown in FIG. 12A, $\eta_7'$ is much smaller than $\eta_1'$ due to the impact of residual image contents of the template media behind the CRTT's in that line groups. This is, however, appropriate threshold for this line groups in order to correctly identify the centroids of these lines. As can be seen from FIG. 12B, in the case of CRTT's printed on the blank paper, the resulting local thresholds $\eta'$'s will be close to each other and close the global threshold $\eta$ derived from prior art.

As is clear from a comparison between the graphs in FIGS. 11A and 11B with the graphs in FIGS. 12A and 12B, the global thresholding strategy used in the prior art works well for the image in FIG. 10B (i.e., when the test pattern is printed on blank paper) but does not work for the image in FIG. 10A (i.e., where the image contents of the template media are not fully removed after procedure 370 of the method 300). Therefore, impact of the "background non-uniformity" caused by the image content of the template media or the preprinted forms may be reduced dramatically by a) identifying individual CRTT lines (or group of CRTT lines) and b) processing these identifying individual CRTT lines (or group of CRTT lines) in isolation, as proposed by the local thresholding strategy of the present disclosure.

At procedure 395, the method 300 is configured to determine whether the determined process direction misregistration and cross-process direction misregistration are less than a threshold. In one embodiment, the threshold may be a predetermined value or range. If it is determined that the determined process direction misregistration and cross-process direction misregistration are less than the threshold, then the method 300 proceeds to procedure 398. If not (i.e., the determined process direction misregistration and cross-process direction misregistration are not less than the threshold), the method 300 returns to procedure 330 where the test pattern is printed on the template media (i.e., during cycle up), then to procedure 340 and so on. In one embodiment, if the determined process direction misregistration and cross-process direction misregistration are not less than the threshold, then the method 300 may be configured to adjust the cross-process position and process position of printheads before returning to procedure 330.

In one embodiment, if it is determined that the determined process direction misregistration and cross-process direction misregistration are less than the threshold, then the method 300 (i.e., before proceeding to procedure 398) is configured to adjust cross-process position and process position of printheads to provide adjusted color registration on subsequent template media.

In one embodiment, the registration algorithm (i.e., procedures 380, 390 and 395 as shown and explained with respect to FIG. 3) uses the amplitude of a repeating pattern at the expected spacing between dashes to compute the x- and the y-positions.

The method 300 ends at procedure 398, where cycle up of the continuous web printing system 100 ends and printing (i.e., runtime print job) starts.

In one embodiment, the procedures 310-398 can be performed by one or more computer program modules that can be executed by one or more processors 220 (as shown in and explained with respect to FIGS. 1 and 2).

As used herein, "template markings" are any type of marks, visible to the human eye or otherwise detectable by some kind of sensor, that are positioned on the web so that marks or images subsequently made on the web in a printing process in some way fit with or correspond to the template markings, either whereby the template markings and the printed images form a single coherent visible image, or for some other purpose, such as fiducial or encoding marks. A template marking may also be in the form a physical feature of the web, such as perforations, notches, or stickers disposed on a backing web, in cases where a printer is used to make labels.

Embodiments of the present disclosure, the processor, for example, may be made in hardware, firmware, software, or various combinations thereof The present disclosure may also be implemented as instructions stored on a machine-readable medium, which may be read and executed using one or more processors. In one embodiment, the machine-readable medium may include various mechanisms for storing and/or transmitting information in a form that may be read by a machine (e.g., a computing device). For example, a machine-readable storage medium may include read only memory, random access memory, magnetic disk storage media, optical storage media, flash memory devices, and other media for storing information, and a machine-readable transmission media may include forms of propagated signals, including carrier waves, infrared signals, digital signals, and other media for transmitting information. While firmware, software, routines, or instructions may be described in the above disclosure in terms of specific exemplary aspects and embodiments performing certain actions, it will be apparent that such descriptions are merely for the sake of convenience and that such actions in fact result from computing devices, processing devices, processors, controllers, or other devices or machines executing the firmware, software, routines, or instructions.

While the present disclosure has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the present disclosure following, in general, the principles of the present disclosure and including such departures from the present disclosure as come within known or customary practice in the art to which the present disclosure pertains, and as may be applied to the essential features hereinbefore set forth and followed in the spirit and scope of the appended claims.

What is claimed is:

1. A computer-implemented method for performing color registration on template media having template markings thereon, wherein the method is implemented in a computer system comprising one or more processors configured to execute one or more computer program modules, the method comprising:

sensing the template media using a sensor positioned along a process path of a web to obtain first image data;

printing a test pattern on the template media;

sensing the template media along with the test pattern printed thereon using the sensor to obtain second image data;

determining an output image data of the test pattern from the first image data, the second image data, and an estimated image data of the template media with the test pattern printed thereon, wherein the estimated image data is a function of light scatter from the test pattern and light absorption by the test pattern;

determining at least one of a process direction misregistration and a cross-process direction misregistration from the output image data; and adjusting at least one of a cross-process position and a process position of printheads based on the process direction misregistration and cross-process direction misregistration to provide adjusted color registration on subsequent template media, wherein the light scatter from the test pattern is determined by performing an off-line characterization of light absorption and light scattering of each ink or toner of the test pattern using a light scatter model.

2. The method of claim 1, wherein the estimated image data of the template media with the test pattern printed thereon for each ink or toner in the test pattern is determined using the Kubelka-Munk model.

3. The method of claim 1, further comprising performing image registration between the first input image data and the second input image data by aligning reference points on the first input image data with reference points on the second input image data, wherein the image registration is performed before determining the output image data of the test pattern.

4. The method of claim 3, further comprising removing any residual errors in the output image data that resulted from an imperfect image registration.

5. The method of claim 1, wherein the template markings include form images, marks, report formats, banners, logos, letterhead, data heading for spaces for data, pre-printed text, pre-printed boxes, pre-printed lines, and/or questions with corresponding spaces for answers.

6. The method of claim 1, wherein the sensor is a linear array sensor.

7. The method of claim 6, wherein the linear array sensor is a full width array (FWA) sensor.

8. The method of claim 1, wherein the test pattern comprises a plurality of dashes, the dashes being process direction dashes.

9. The method of claim 1, wherein determining the output image data of the test pattern further comprises improving contrast of the output image data.

10. The method of claim 1, wherein determining the output image data of the test pattern further comprises applying a local thresholding strategy to the output image data.

11. The method of claim 10, wherein the local thresholding strategy is configured to divide the output image data into groups of dash lines, and calculate a local threshold for each group of dash lines.

12. A system for performing color registration on template media having template markings thereon, the system comprising:
a print engine configured to print a test pattern on the template media;
a sensor positioned along a process path of a web, the sensor configured to sense
  a) the template media to obtain first image data; and
  b) the template media along with the test pattern printed thereon to obtain second image data;
a processor configured to
  a) determine an output image data of the test pattern from the first image data, the second image data, and an estimated image data of the template media with the test pattern printed thereon, wherein the estimated image data is a function of light scatter from the test pattern and light absorption by the test pattern; and
  b) determine at least one of a process direction misregistration and a cross-process direction misregistration from the output image data; and
a controller configured to adjust at least one of a cross-process position and a process position of printheads based on the process direction misregistration and cross-process direction misregistration to provide adjusted color registration on subsequent template media, wherein the light scatter from the test pattern is determined by performing an off-line characterization of light absorption and light scattering of each ink or toner of the test pattern using a light scatter model.

13. The system of claim 12, wherein the estimated image data of the template media with the test pattern printed thereon for each toner or ink in the test pattern is determined using the Kubelka-Munk model.

14. The system of claim 12, the processor is further configured to perform an image registration between the first input image data and the second input image data by aligning reference points on the first input image data with reference points on the second input image data, wherein the image registration is performed before the output image data of the test pattern is determined.

15. The system of claim 14, the processor is further configured to remove any residual errors in the output image data that resulted from an imperfect image registration.

16. The system of claim 12, wherein the template markings include form images, marks, report formats, banners, logos, letterhead, data heading for spaces for data, pre-printed text, pre-printed boxes, pre-printed lines, and/or questions with corresponding spaces for answers.

17. The system of claim 12, wherein the sensor is a linear array sensor.

18. The system of claim 17, wherein the linear array sensor is a full width array (FWA) sensor.

19. The system of claim 12, wherein the test pattern comprises a plurality of dashes, the dashes being process direction dashes.

20. The system of claim 12, wherein the processor is configured to improve the contrast of the output image data.

21. The system of claim 12, wherein the processor is configured to apply a local thresholding strategy to the output image data.

22. The system of claim 21, wherein the local thresholding strategy is configured to divide the output image data into groups of dash lines, and calculate a local threshold for each group of dash lines.

23. A computer-implemented method for performing color registration on template media having template markings thereon, wherein the method is implemented in a computer system comprising one or more processors configured to execute one or more computer program modules, the method comprising:
sensing the template media using a sensor positioned along a process path of a web to obtain first image data;
printing a test pattern on the template media;
sensing the template media along with the test pattern printed thereon using the sensor to obtain second image data;
transforming the first image data and the second image data into an absorbance space to obtain a first absorbance and a second absorbance, respectively;
determining a difference between the first absorbance and the second absorbance;
applying a correction factor to the determined difference to obtain an output absorbance, the output absorbance is representative of absorbance corresponding to the test pattern and the correction factor is a function of light scatter from the test pattern;
transforming the output absorbance into a reflectivity space to obtain an output image data, the output image data being representative of image data of the test pattern;

determining at least one of a process direction misregistration and a cross-process direction misregistration from the output image data; and adjusting at least one of a cross-process position and a process position of printheads based on the process direction misregistration and cross-process direction misregistration to provide adjusted color registration on subsequent template media wherein the light scatter from the test pattern is determined by performing an off-line characterization of light absorption and light scattering of each ink or toner of the test pattern using a light scatter model.

24. The method of claim 23, wherein the correction factor is a function of the first absorbance and the second absorbance.

25. The system of claim 23, wherein the sensor is a linear array sensor.

26. A computer-implemented method for performing color registration on template media having template markings thereon, wherein the method is implemented in a computer system comprising one or more processors configured to execute one or more computer program modules, the method comprising:

sensing the template media using a sensor positioned along a process path of a web to obtain first image data;

printing a test pattern on the template media;

sensing the template media along with the test pattern printed thereon using the sensor to obtain second image data;

transforming the first image data and the second image data into an absorbance space to obtain a first absorbance and a second absorbance, respectively;

determining a difference between the first absorbance and the second absorbance;

applying a correction factor to the determined difference to obtain an output absorbance, the output absorbance is representative of absorbance corresponding to the test pattern and the correction factor is representative of light scatter from the test pattern;

transforming the output absorbance into a reflectivity space to obtain an output image data, the output image data being representative of image data of the test pattern;

determining at least one of a process direction misregistration and a cross-process direction misregistration from the output image data; and adjusting at least one of a cross-process position and a process position of printheads based on the process direction misregistration and cross-process direction misregistration to provide adjusted color registration on subsequent template media, wherein the correction factor is determined during an off-line calibration procedure using the following equation:

$$T_{Tj} = A_{ij} - A_{Fi} - f[A_{ij}, A_{Fi}]$$

where $A_{Tj}$ is a measured absorbance of the test target printed over a bare substrate;

$A_{Fi}$ is a measured absorbance of the template media;

$A_{ij}$ is a measured absorbance of the template media with the test target printed thereon;

j corresponds to each ink or toner in the test pattern;

i represents various preprinted colors in the template media; and $f[A_{ij}, A_{Fi}]$ is the correction factor.

* * * * *